(12) United States Patent
Sun

(10) Patent No.: US 8,665,588 B2
(45) Date of Patent: Mar. 4, 2014

(54) FASTENING DEVICE FOR HARD DISK DRIVE

(75) Inventor: Zheng-Heng Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 62 days.

(21) Appl. No.: 13/473,630

(22) Filed: May 17, 2012

(65) Prior Publication Data

US 2013/0258579 A1 Oct. 3, 2013

(30) Foreign Application Priority Data

Mar. 27, 2012 (CN) .......................... 2012 1 0083908

(51) Int. Cl.
- *G06F 1/16* (2006.01)
- *A47B 81/00* (2006.01)
- *A47F 7/00* (2006.01)

(52) U.S. Cl.
USPC ............ 361/679.33; 361/679.37; 361/679.39; 312/223.1; 312/223.2; 211/26

(58) Field of Classification Search
USPC .................. 361/679.31–679.4, 724–727; 312/223.1, 223.2; 211/26
See application file for complete search history.

(56) References Cited

U.S. PATENT DOCUMENTS

| | | | | |
|---|---|---|---|---|
| 5,564,804 A * | 10/1996 | Gonzalez et al. | ........... | 312/223.2 |
| 6,272,008 B1 * | 8/2001 | Huang | ...................... | 361/679.35 |
| 6,452,792 B1 * | 9/2002 | Chen | ......................... | 361/679.35 |
| 6,762,932 B2 * | 7/2004 | Regimbal et al. | ........ | 361/679.33 |
| 6,944,013 B2 * | 9/2005 | Yang | ........................ | 361/679.33 |
| 6,954,940 B2 * | 10/2005 | Hsu | ................................ | 720/639 |
| 7,355,846 B1 * | 4/2008 | Chen et al. | ............... | 361/679.33 |
| 7,495,905 B2 * | 2/2009 | Peng et al. | ............... | 361/679.31 |
| 7,839,629 B2 * | 11/2010 | Yeh | ........................... | 361/679.37 |
| 2004/0173544 A1 * | 9/2004 | Chen | ............................... | 211/26 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A fastening device for a hard disk drive (HDD) includes two fastening members and a bottom plate. Each fastening member includes a sidewall, and a top wall and a bottom wall perpendicularly extending from opposite sides of the sidewall. The top walls are fastened to a bottom of the HDD. An engaging hole is defined in each bottom wall. The engaging hole includes a first hole and a second hole. A positioning tab extends from one of the fastening members. A block is formed on the positioning tab. Two protrusions protrude from the bottom plate. A positioning portion is formed on the bottom plate. The HDD is operable to slide to allow the protrusions to engage in the first holes. The positioning tab extends through a through hole bounded by the positioning portion and bottom plate, to allow the block to be blocked by the positioning portion.

5 Claims, 7 Drawing Sheets

FASTENING DEVICE FOR HARD DISK DRIVE

BACKGROUND

1. Technical Field

The present disclosure relates to a device for fastening a hard disk drive (HDD).

2. Description of Related Art

Many HDDs are screwed to brackets in computers such that the HDDs are rigidly connected to chassis of the computers, which means any vibrations or shocks to the chassis are easily transferred to the HDDs. When an HDD is operating at a high speed, such vibrations may harm the HDD.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
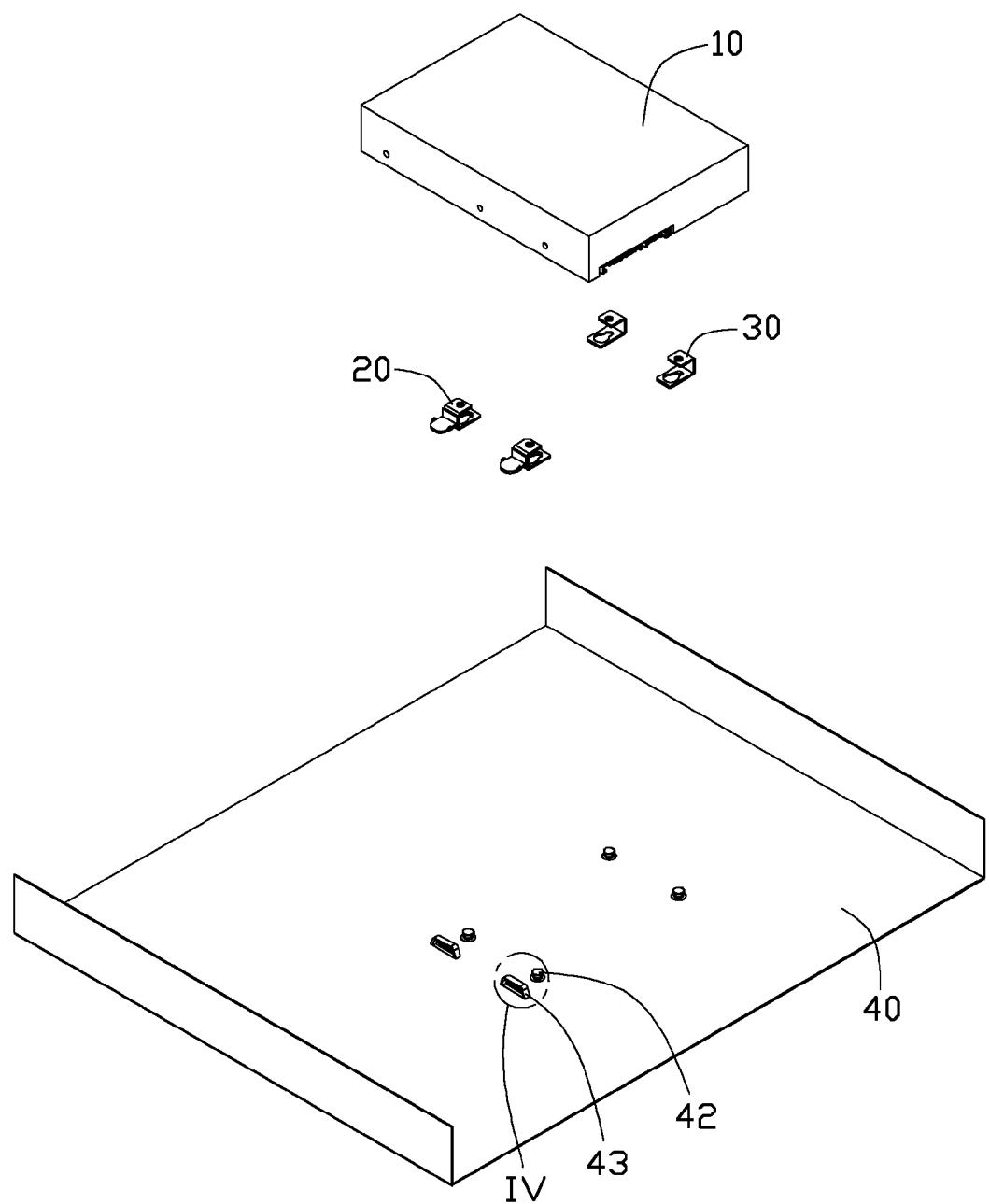
FIG. 1 is an exploded, isometric view of an exemplary embodiment of a fastening device together with a hard disk drive (HDD), wherein the fastening device includes two first fastening members and two second fastening members.
Figure 2:
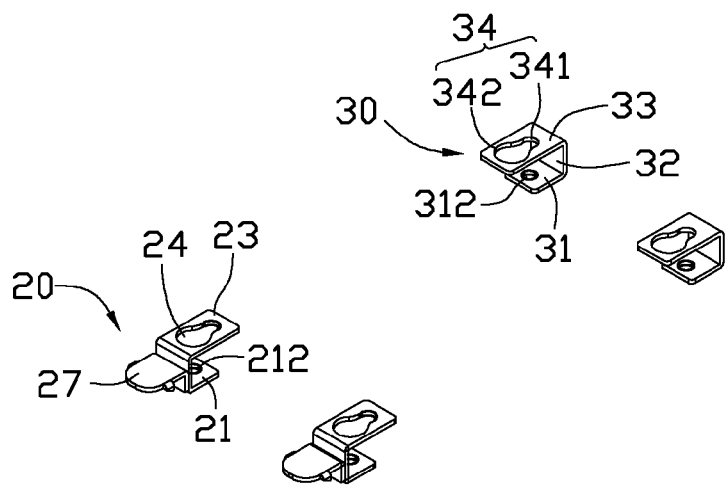
FIG. 2 is an inverted view of the first fastening members, the second fastening members, and the HDD of FIG. 1.
Figure 2:
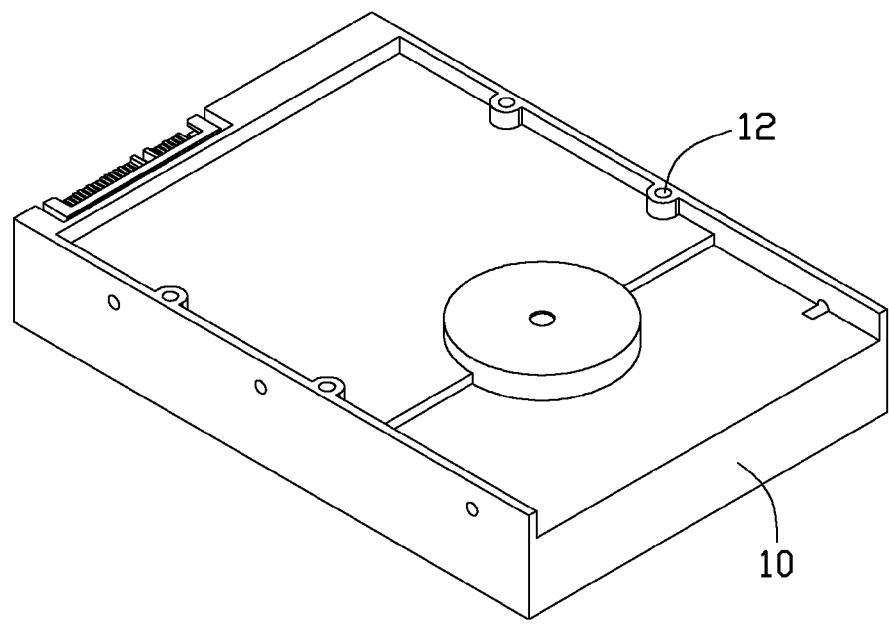

FIGS. 1 and 2 show an exemplary embodiment of a fastening device for a hard disk drive (HDD) 10. Four mounting holes 12 are defined in a bottom of the HDD 10, adjacent to opposite sides of the HDD 10 respectively. The fastening device includes a bottom plate 40, two first fastening members 20, and two second fastening members 30.

Figure 3:
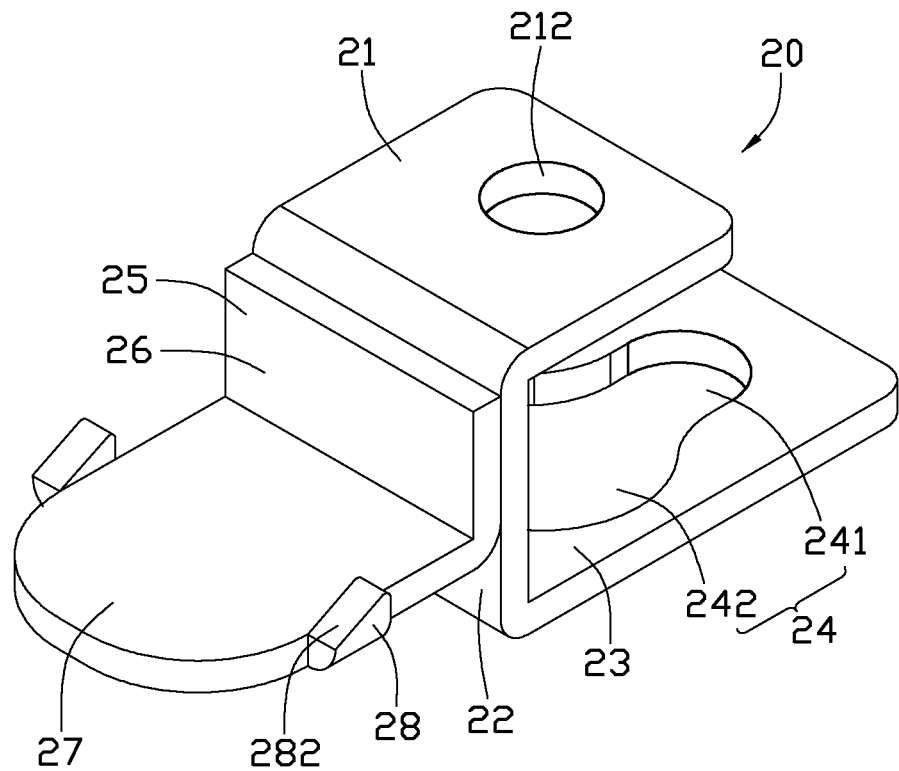
FIG. 3 is an enlarged view of one of the first fastening members of FIG. 2.

FIG. 3 shows each first fastening member 20 including a sidewall 22, a fastening portion 25 fastened to the sidewall 22, and a top wall 21 and a bottom wall 23 perpendicularly extending away from the fastening portion 25 from a top and a bottom side of the sidewall 22, respectively. A through hole 212 is defined in the top wall 21. An engaging hole 24 is defined in the bottom wall 23, extending along a direction perpendicular to the sidewall 22. The engaging hole 24 includes a small first hole 241 and a large second hole 242 communicating with the first hole 241. The second hole 242 is adjacent to the sidewall 22 relative to the first hole 241. The fastening portion 25 is substantially L-shaped, and includes a connection tab 26 fastened to a side surface of the sidewall 22 away from the top and bottom walls 21 and 23, and a positioning tab 27 perpendicularly extending from a bottom side of the connection tab 26. The positioning tab 27 is parallel to the bottom wall 23. Two substantially wedge-shaped blocks 28 are formed on opposite sides of the positioning tab 27. A slanting guiding surface 282 is formed on a top of each block 28.

FIG. 2 shows the substantially U-shaped second fastening members 30. Each second fastening member 30 includes a sidewall 32, and a top wall 31 and a bottom wall 33 perpendicularly extending from a top and a bottom side of the sidewall 32. A through hole 312 is defined in the top wall 31. An engaging hole 34 is defined in the bottom wall 33, extending along a direction perpendicular to the sidewall 32. The engaging hole 34 includes a small first hole 341 and a large second hole 342 communicating with the first hole 341. The first hole 341 is adjacent to the sidewall 32 relative to the second hole 342.

Figure 4:
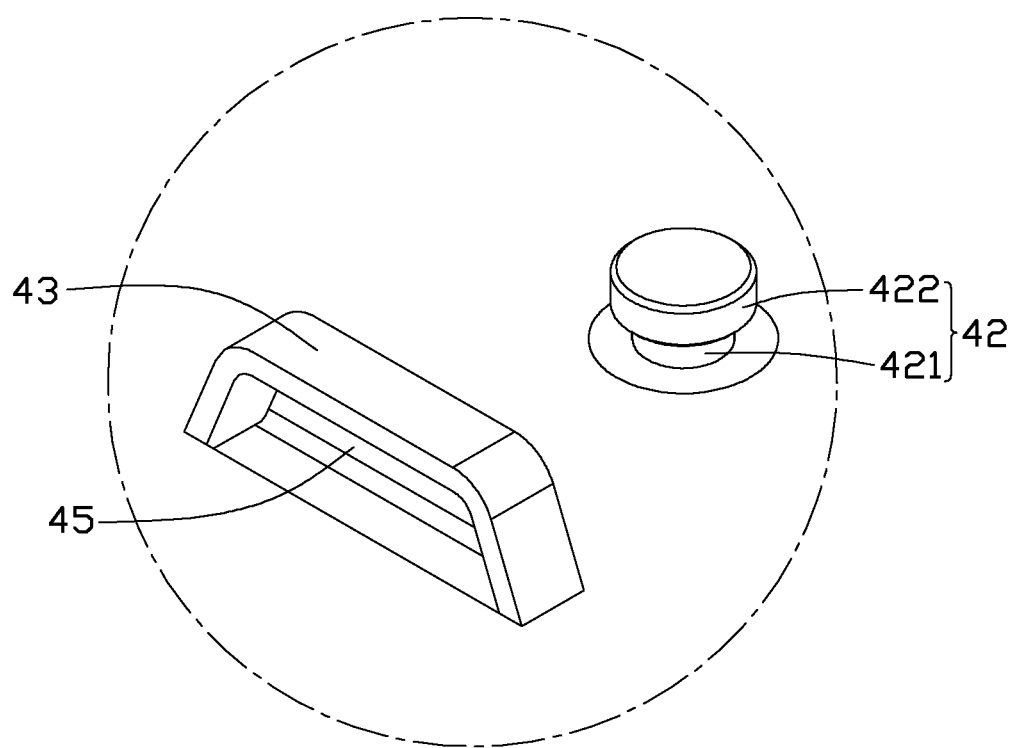
FIG. 4 is an enlarged view of a circled portion IV of FIG. 1.

FIGS. 1 and 4 show four protrusions 42 protruding up from the bottom plate 40. The protrusions 42 form the four corners of a rectangle. Each protrusion 42 includes a small neck 421 extending up from the bottom plate 40 and a large head 422 formed on a top of the neck 421. Two positioning portions 43 are formed on the bottom plate 40, beside two of the protrusions 42. Each positioning portion 43 is substantially bridge-shaped, bounding a through hole 45 with the bottom plate 40.

Figure 5:
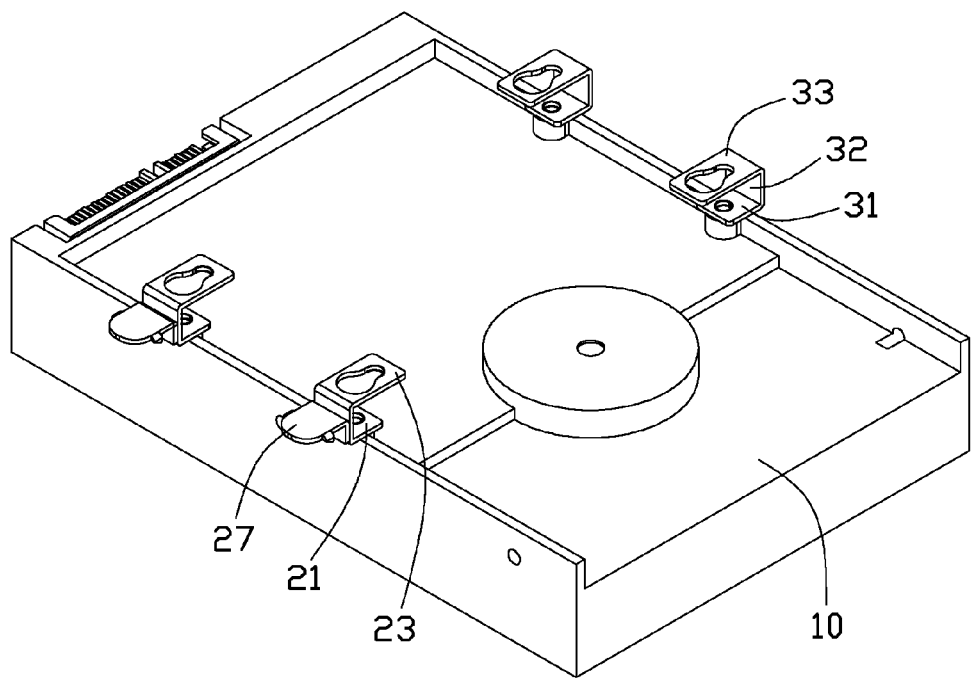
FIG. 5 is an assembled, isometric view of FIG. 2.
Figure 6:
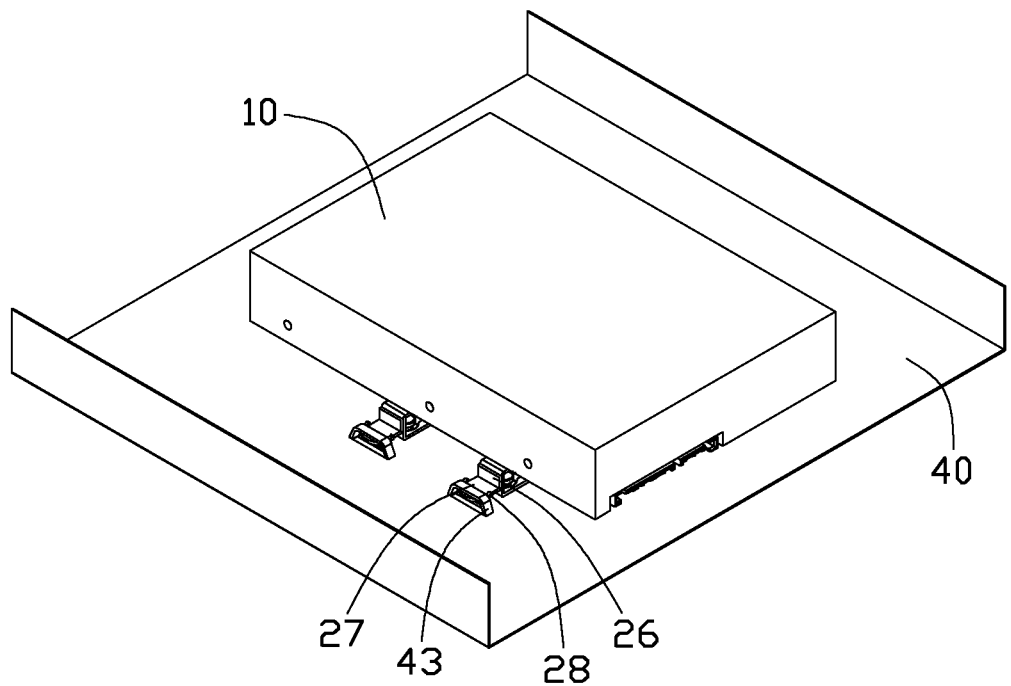
FIG. 6 is an assembled, isometric view of FIG. 1.
Figure 7:
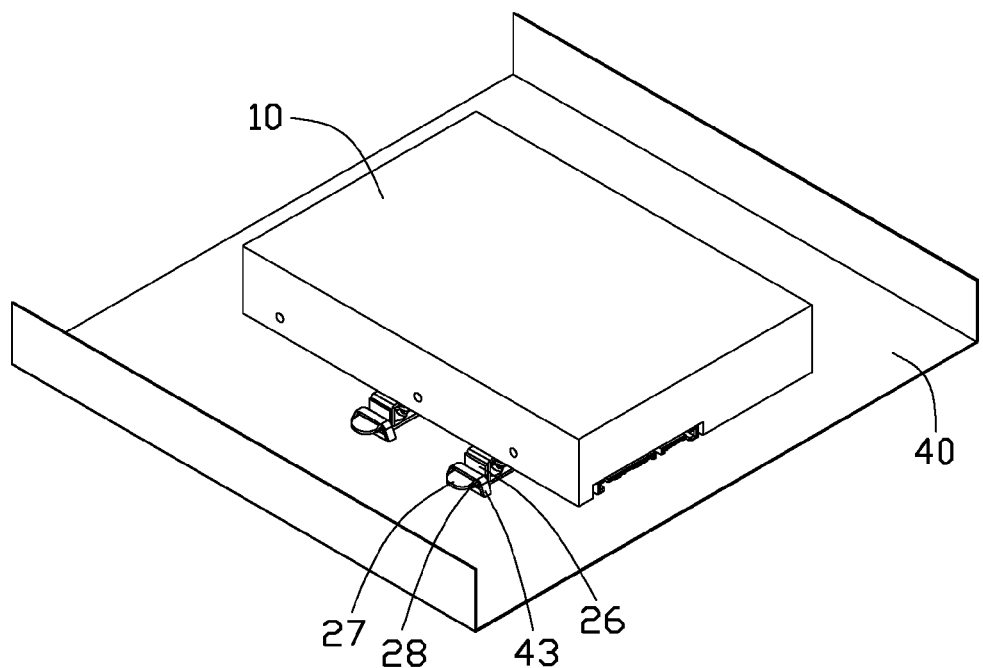
FIG. 7 is similar to FIG. 6, but shows a different state.

FIGS. 5-7 show in assembly, the top walls 21 and 31 are placed on the bottom of the HDD 10. The through holes 212 align with the mounting holes 12 adjacent to a first side of the HDD 10. The through holes 312 align with the mounting holes 12 adjacent to a second side of the HDD 10 opposite to the first side. The sidewalls 22 and the sidewalls 32 are placed away from each other. Four screws extend through the corresponding through holes 212 and 312, and then engage in the corresponding mounting holes 12. Therefore, the first fastening members 20 and the second fastening members 30 are fastened to the HDD 10.

The HDD 10 together with the first fastening members 20 and the second fastening members 30 is placed above the bottom plate 40. The second holes 242 and 342 align with the corresponding protrusions 42. The HDD 10 is manipulated downward, to make the protrusions 42 extend through the corresponding second holes 242 and 342. The bottom walls 23 and 33 abut against the bottom plate 40. The HDD 10 is slid toward the positioning portions 43 on the bottom plate 40. The necks 421 engage in the corresponding first holes 241 and 341, the heads 422 abut against the corresponding bottom walls 23 and 33. The positioning tabs 27 is deformed after abutting against the corresponding positioning portions 43, and is restored after the blocks 28 is guided by the guiding surfaces 282 to extend through the corresponding through holes 45. The blocks 28 are blocked by a side of the positioning portions 43 away from the protrusions 42. Therefore, the HDD 10 is fastened to the bottom plate 40.

The HDD 10 is fastened to the bottom plate 40 by the first fastening members 20 and second fastening members 30. A certain distance exists between the bottom plate 40 and the HDD 10. When the first fastening members 20 and second fastening members 30 are subjected to vibrations or shocks, the first fastening members 20 and second fastening members 30 can be deformed to absorb at least part of vibration energy.

In other embodiments, the connection tab 26 of each first fastening member 20 is omitted, the positioning tab 27 perpendicularly extends from the sidewall 22 directly.

In other embodiments, the first hole 341 is away from the sidewall 32 relative to the second hole 342 in each second fastening member 30, which means each second fastening member 30 is the same as each first fastening member 20 except for the fastening portion 25. In assembly, the sidewalls 32 are placed toward the first fastening members 20.

Even though numerous characteristics and advantages of the embodiments have been set forth in the foregoing description, together with details of the structure and the functions of the embodiments, the disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A fastening device for a hard disk drive (HDD), comprising:
    a bottom plate, two protrusions protruding up from the bottom plate, a positioning portion formed on the bottom plate, the positioning portion and the bottom plate bounding a through hole; and
    two fastening members each comprising a sidewall, and a top wall and a bottom wall perpendicularly extending from top and bottom sides of the sidewall, the top walls fastened to a bottom of the HDD, each bottom wall defining an engaging hole, the engaging hole comprising a large first hole through which a corresponding protrusion extends, and a small second hole communicating with the first hole to allow the protrusion to enter from the first hole, a positioning tab extending from one of the fastening members to extend through the through hole, a block formed on the positioning tab to engage with the positioning portion, and a slanting guiding surface formed on a top of the block, wherein the slanting guiding surface guides the block to pass through the through hole.

2. The fastening device of claim 1, wherein each protrusion comprises a small neck extending up from the bottom plate and a large head formed on a top of the neck, the neck engages in the corresponding second hole after entering the second hole, the head abuts against the corresponding bottom wall.

3. The fastening device of claim 1, wherein a fastening portion is fastened to the sidewall of the fastening member with the positioning tab, the fastening portion comprises a connection tab fastened to a side surface of the sidewall opposite to the top and bottom walls, the positioning tab perpendicularly extends from a bottom of the connection tab, parallel to the corresponding bottom wall.

4. The fastening device of claim 1, wherein the positioning portion is substantially bridge-shaped.

5. A fastening device for a hard disk drive (HDD), comprising:
    a bottom plate, two protrusions protruding up from the bottom plate, a positioning portion formed on the bottom plate, the positioning portion and the bottom plate bounding a through hole; and
    two fastening members each comprising a sidewall, and a top wall and a bottom wall perpendicularly extending from top and bottom sides of the sidewall, the top walls fastened to a bottom of the HDD, each bottom wall defining an engaging hole, the engaging hole comprising a large first hole through which a corresponding protrusion extends, and a small second hole communicating with the first hole to allow the protrusion to enter from the first hole, a positioning tab extending from one of the fastening members to extend through the through hole, a block formed on the positioning tab to engage with the positioning portion;
    wherein a fastening portion is fastened to the sidewall of the fastening member with the positioning tab, the fastening portion comprises a connection tab fastened to a side surface of the sidewall opposite to the top and bottom walls, the positioning tab perpendicularly extends from a bottom of the connection tab, parallel to the corresponding bottom wall.

* * * * *